US012210591B2

United States Patent
Lin et al.

(10) Patent No.: US 12,210,591 B2
(45) Date of Patent: Jan. 28, 2025

(54) WEAKLY SUPERVISED EXTRACTION OF ATTRIBUTES FROM UNSTRUCTURED DATA TO GENERATE TRAINING DATA FOR MACHINE LEARNING MODELS

(71) Applicant: Maplebear Inc., San Francisco, CA (US)

(72) Inventors: Shih-Ting Lin, Austin, TX (US); Jonathan Newman, Menlo Park, CA (US); Min Xie, Santa Clara, CA (US); Haixun Wang, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 758 days.

(21) Appl. No.: 17/407,158

(22) Filed: Aug. 19, 2021

(65) Prior Publication Data
US 2023/0058829 A1   Feb. 23, 2023

(51) Int. Cl.
*G06K 9/62* (2022.01)
*G06F 18/21* (2023.01)
*G06F 18/214* (2023.01)
*G06F 18/22* (2023.01)
*G06F 18/23* (2023.01)
*G06Q 30/06* (2023.01)
*G06Q 30/0601* (2023.01)

(52) U.S. Cl.
CPC ............ *G06F 18/23* (2023.01); *G06F 18/214* (2023.01); *G06F 18/2178* (2023.01); *G06F 18/22* (2023.01); *G06Q 30/0641* (2013.01)

(58) Field of Classification Search
CPC .... G06F 18/214; G06F 18/2178; G06F 18/22; G06F 18/23; G06Q 30/0641
See application file for complete search history.

(56) References Cited

U.S. PATENT DOCUMENTS

| | | | |
|---|---|---|---|
| 11,386,478 B1 * | 7/2022 | Jones | G06Q 30/0633 |
| 2012/0259882 A1 * | 10/2012 | Thakur | G06F 16/954 |
| | | | 707/E17.074 |
| 2021/0118036 A1 * | 4/2021 | Jiang | G06Q 30/0641 |

* cited by examiner

*Primary Examiner* — Michael J Vanchy, Jr.
(74) *Attorney, Agent, or Firm* — Fenwick & West LLP

(57) ABSTRACT

An online concierge system receives unstructured data describing items offered for purchase by various warehouses. To generate attributes for products from the unstructured data, the online concierge system extracts candidate values for attributes from the unstructured data through natural language processing. One or more users associate a subset candidate values with corresponding attributes, and the online concierge system clusters the remaining candidate values with the candidate values of the subset associated with attributes. One or more users provide input on the accuracy of the generated clusters. The candidate values are applied as labels to items by the online concierge system, which uses the labeled items as training data for an attribute extraction model to predict values for one or more attributes from unstructured data about an item.

24 Claims, 5 Drawing Sheets

WEAKLY SUPERVISED EXTRACTION OF ATTRIBUTES FROM UNSTRUCTURED DATA TO GENERATE TRAINING DATA FOR MACHINE LEARNING MODELS

BACKGROUND

This disclosure relates generally to training of machine learning models, and more specifically to obtaining labeled attributes of items from unstructured data describing item.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in a user's order in a warehouse and deliver the items included in the order to a location specified by the user.

Many online systems, such as online concierge systems, receive unstructured data describing items accessible through an online system. For example, one or more warehouses provide a title, a description, and other textual information describing items offered by a warehouse to an online concierge system. Extracting attributes of an item from the received unstructured data allows an online concierge system, or other online system, to more efficiently identify items for users or to surface relevant information about items to users. For example, extracting attributes of items allows an online concierge system, or other online system, to identify items for display as search results or as recommendations to users.

However, extracting attributes of an item from unstructured data describing the item is computationally expensive because of a large diversity in potential attributes, as well as because of large numbers of items for which unstructured data is obtained. Additionally, when classifying items into categories, there are a large number of potential categories for an item, with items often belonging to multiple categories. As each category may have a different set of attributes for items, different machine learning models are needed to be trained on different sets of attributes of items. While machine learning model architectures and designs are available for implementation, the available architectures and designs assume a sufficient amount of training data to train the machine learning models to extract attributes of an item from unstructured data describing the item. However, existing methods for obtaining sufficient structured data for items to generate training data for training one or more machine learning models are difficult to scale and resource intensive, with conventional approaches for obtaining the structured data about items relying on manual review of unstructured data describing an item and generating structured data for an item from the manual review of unstructured data describing the item.

SUMMARY

An online concierge system, or another online system, receives unstructured data describing various items for display to users of the online concierge system. In various embodiments, the online concierge system receives an item catalog from a warehouse that identifies various items offered for purchase via the warehouse. For example, an item catalog includes an item identifier for an item associated with a name of the item, with a textual description of the item, with one or more images of the item, with a category of the item, as well as any other suitable information describing the item. The name of an item comprises a text string including one or more words. In various embodiments, the item catalog includes any suitable information describing items offered for purchase by the warehouse.

For each of a set of items, the online concierge system extracts candidate values for attributes of an item from names of each item in the set. In various embodiments, the set of items is selected as items having a common category in a received item catalog or items associated with a common category by the online concierge system. To extract candidate values for attributes of an item, the online concierge system applies one or more natural language processing methods to a name of the item to generate segments from the name of the item. Each segment generated from a name of an item is a candidate value for an attribute of an item. For example, for an item name of "2% reduced fat milk," application of one or more natural language processing methods generates candidate values of "2% reduced fat," "milk," "2%," "reduced fat," and potentially other candidate values depending on the natural language processing methods applied to the item name. Application of the one or more natural language processing methods allows the online concierge system to leverage item names, or other unstructured text describing items, for candidate values of attributes of items. The online concierge system stores each candidate value as a segment from a name of an item of the set in association with a frequency with which a segment occurred in the set of items and a name of an item from which the segment was extracted. In various embodiments, the online concierge system reviews and removes certain candidate values that were extracted. For example, the online concierge system filters candidate values satisfying one or more criteria from the candidate values to reduce potential noise in the candidate values.

Additionally, the online concierge system maintains a group of attributes for items of the set, with the group identifying attributes for items of the set. Hence, the group includes identifiers, such as names, of different attributes for items of the set. The online concierge system displays identifiers of various attributes to users along with certain candidate values extracted from item names to users. Subsequently, the online concierge system receives inputs from users that associate candidate values with identifiers of attributes. Hence, the received inputs identify candidate values for various attributes based on the inputs received from the users. From the received inputs associating candidate values with attributes, the online concierge system generates a seed set of values for various attributes. The seed set associates an attribute with one or more potential values of the attribute from the candidate values extracted from item names. In various embodiments, the online concierge system generates the seed set by identifying one or more candidate values extracted from item names that are selected based on frequencies of occurrence of the candidate values. For example, the online concierge system identifies candidate values associated with a threshold frequency of occurrence or having at least a threshold position in a ranking based on frequency of occurrence. Inputs received from users associate identified candidate values with different attributes to indicate potential values for different attributes.

The online concierge system leverages the generated seed set to generate clusters of candidate values for various attributes from the candidate values. By identifying a subset of the candidate values from their frequencies of occurrence allows the online concierge system to reduce reduces a number of candidate values that users review, reducing an amount of time for users to associate candidate values with various attributes. To associate candidate values not included in the subset identified to users (e.g., candidate values associated with less than a threshold frequency of occurrence or having less than a threshold position in a ranking based on frequency of occurrence), the online concierge system generates clusters of candidate values for attributes using the seed set of values. Candidate values associated with attributes by the inputs received from user form clusters of candidate values corresponding to different attributes. The online concierge system determines distances between candidate values that were not identified to users and the clusters corresponding to different attributes and includes a candidate value in a cluster based on distances between the candidate value and different clusters. The online concierge system includes a candidate value in a cluster from which the candidate value has a minimum distance or has less than a threshold distance. The distance between a cluster and a candidate value may be a semantic distance, a syntactic distance, or a combination of semantic distance and syntactic distance in various embodiments.

To improve accuracy of the generated clusters, the online concierge system receives one or more inputs from users, with an input providing an indication of accuracy of one or more clusters. In some embodiments, the online concierge system displays a generated cluster and a prompt for a user to indicate whether the cluster is accurate. An input from the user indicates whether the cluster is or is not accurate. In some embodiments, an input identifies one or more candidate values included in an incorrect cluster or identifies one or more candidate values to remove from a cluster. This allows an input from a user to modify candidate values associated with an attribute by modifying candidate values included in an attribute corresponding to the cluster. The online concierge system may iteratively receive inputs from users selecting candidate values for attributes, generate the seed set of candidate values for various attributes, generate clusters of candidate values for various attributes, and receive inputs from users indicating accuracy of one or more clusters.

From the generated clusters resulting from the received inputs from users, the online concierge system generates training data including identifiers of items to which one or more labels indicating candidate values of one or more attributes determined from an item name are applied. The online concierge system compares segments extracted from an item name with candidate values for attributes from the generated clusters and applies a label to an identifier of the item identifying one or more candidate values matching one or more segments extracted from the item name. From the training data, the online concierge system generates an attribute extraction model configured to receive an item name, or other unstructured data describing the item, and output predicted values of one or more attributes of a corresponding item from the item name, or other unstructured data describing the item. The online concierge system generates the attribute extraction model by applying the attribute extraction model to examples of items labeled with one or more candidate values for attributes from the training data and using any suitable training method or combination of training methods (e.g., supervised learning, semi-supervised learning, unsupervised learning).

The online concierge system applies the trained attribute extraction model to items, such as to item names, to predict values for one or more attributes of various items. The predicted values are associated with an identifier of an item and subsequently used by the online concierge system to select items for a user or to display items to a user. During use of the trained attribute extraction model, the online concierge system receives feedback from users and updates or retrains the attribute extraction model based on the feedback. Example feedback indicates whether an item selected or displayed based on the predicted values of one or more attributes is accurate or is relevant to a request from a user, allowing the online concierge system to further refine the attribute extraction model during its use.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
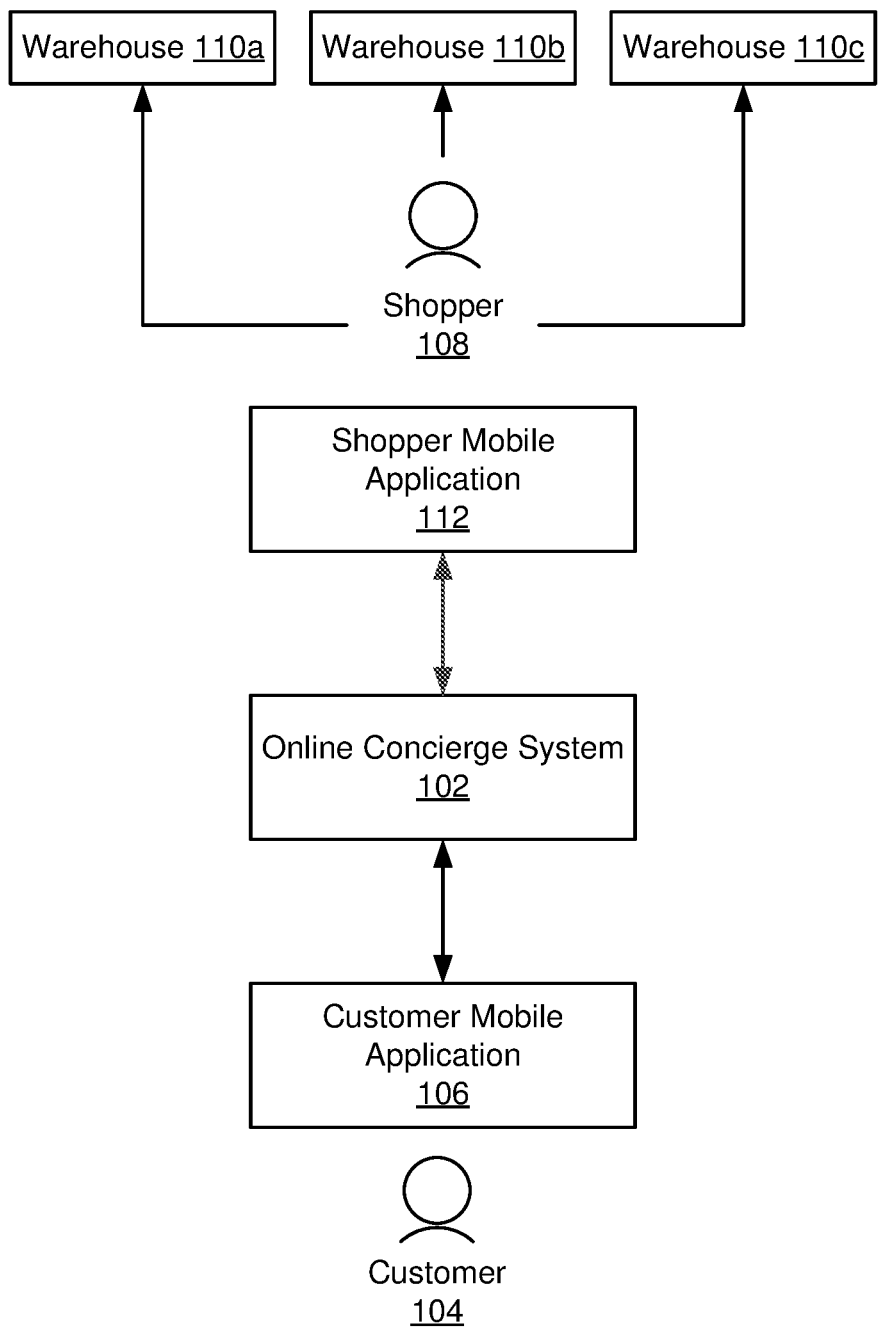
FIG. 1 illustrates an environment of an online shopping concierge service, according to one embodiment.

FIG. 1 illustrates an environment 100 of an online platform, according to one embodiment. The figures use like reference numerals to identify elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
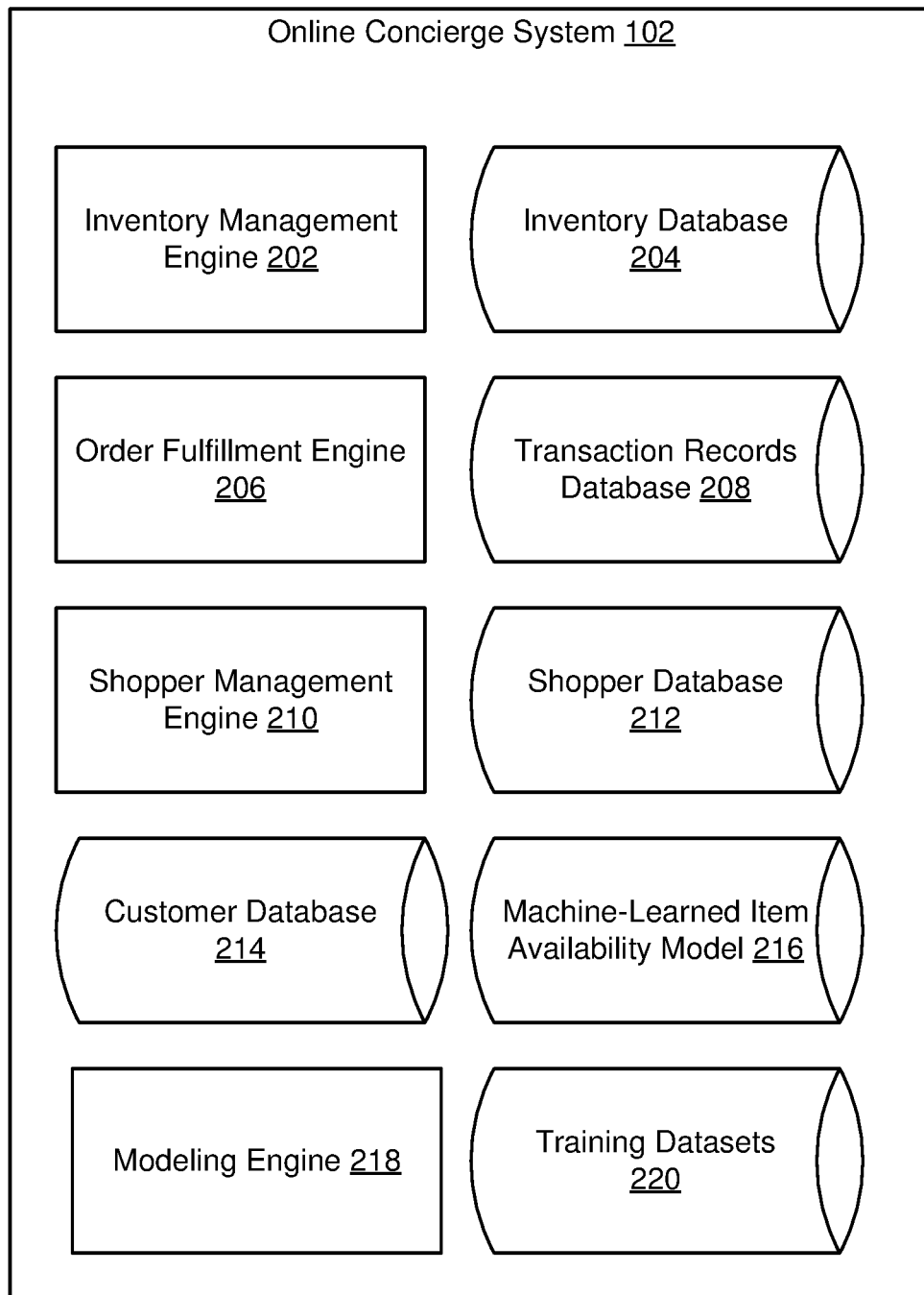
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220.

The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained attribute extraction model that predicts values for one or more attributes of an item from unstructured data describing the item. For example, the attribute extraction model receives as input a text string that is a name of an item and predicts values for one or more attributes of the item from the received text string. To more efficiently train the attribute extraction model, the modeling engine 218 identifies a set of items, such as items having one or more common attributes, and extracts segments from names of each item of the set using one or more natural language processing methods. Each of the extracted segments is a candidate value for an attribute of an item. A frequency with which a segment occurs in the names of the items of the set. As further described below in conjunction with FIGS. 4 and 5, the modeling engine 218 identifies different attributes to a set of users along with a subset of the extracted segments. For example, the modeling engine 218 selects a subset of extracted segments selected based on their frequencies of occurrence. Inputs received from the users associate extracted segments with attributes, with an association between an extracted segment and an attribute indicating the extracted segment is a candidate value of the attribute.

By identifying a subset of the extracted segments of names of items to users, the modeling engine 218 reduces an amount of information for the users to review and to associate with attributes. To account for extracted segments not included in the subset, the modeling engine 218 generates clusters based on the associations by users between attributes and extracted segments. A cluster includes extracted segments associated with an attribute. For an extracted segment not included in the subset, the modeling engine 218 determines distances between the extracted segment not included in the subset and each cluster. Based on the determined distances, the modeling engine 218 includes the extracted segment not included in the subset in a cluster, as further described below in conjunction with FIGS. 4 and 5. After including each extracted segment in a cluster, the modeling engine 218 prompts one or more users to provide input indicating accuracy of the clusters.

From the generated clusters, the modeling engine 218 generates training data for the attribute extraction model by applying labels to various items. A label applied to an item indicates values of the item as candidate values of one or more attributes matching one or more segments of a name of the item or matching segments of other unstructured data describing the item. Each item to which one or more labels is applied is an example in the training data. As further described below in conjunction with FIG. 4, the modeling engine 218 applies the attribute extraction model to examples of the training data and trains the attribute extraction model from differences between a label applied to an example and predicted values for one or more attributes output by the attribute extraction model. Subsequently, the modeling engine 218 applies the trained attribute extraction model to names of items or other unstructured data describing items to generate predicted values of one or more attributes for the item.

Machine-Learning Factors

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

Customer Mobile Application

Figure 3A:
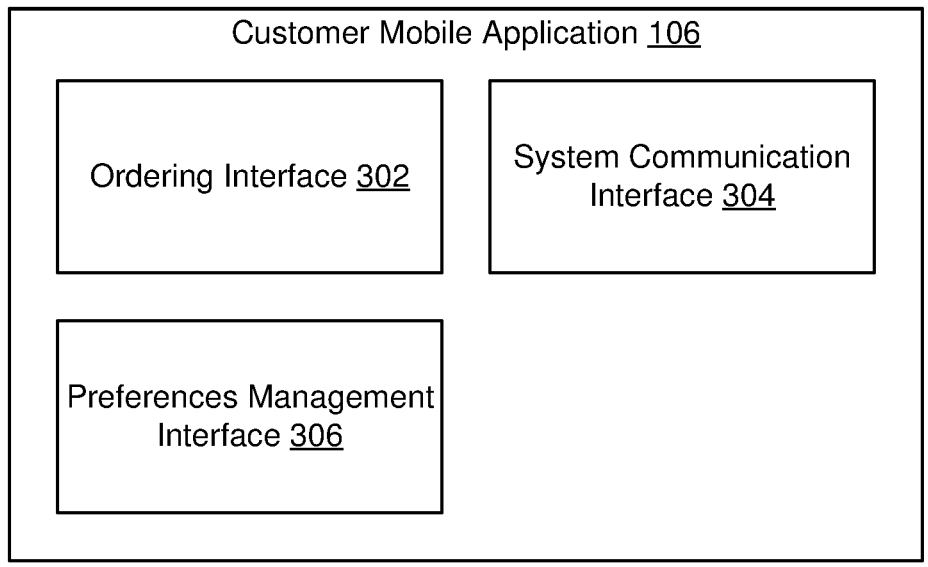
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
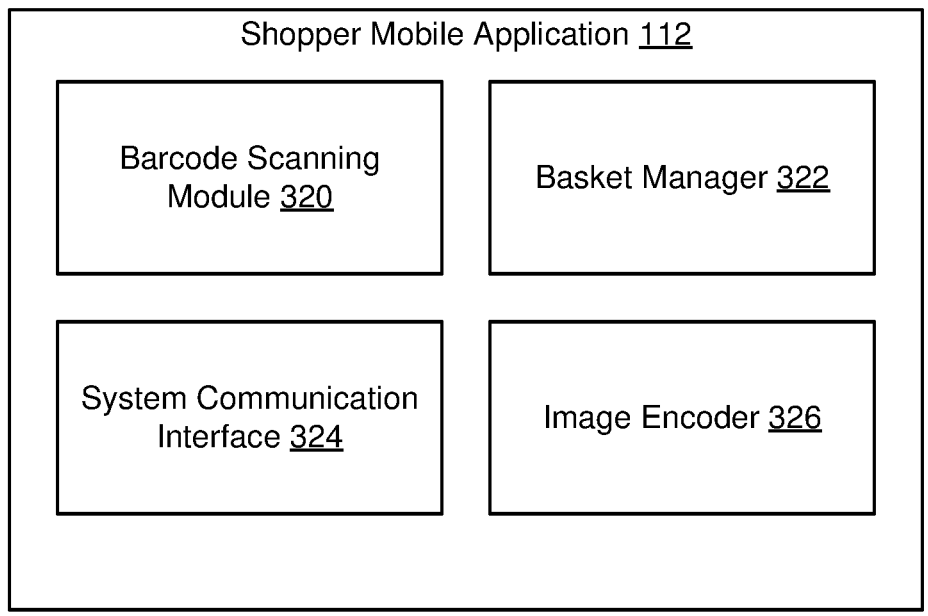
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from system 102 and transmits the contents of a basket of items to system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 4:
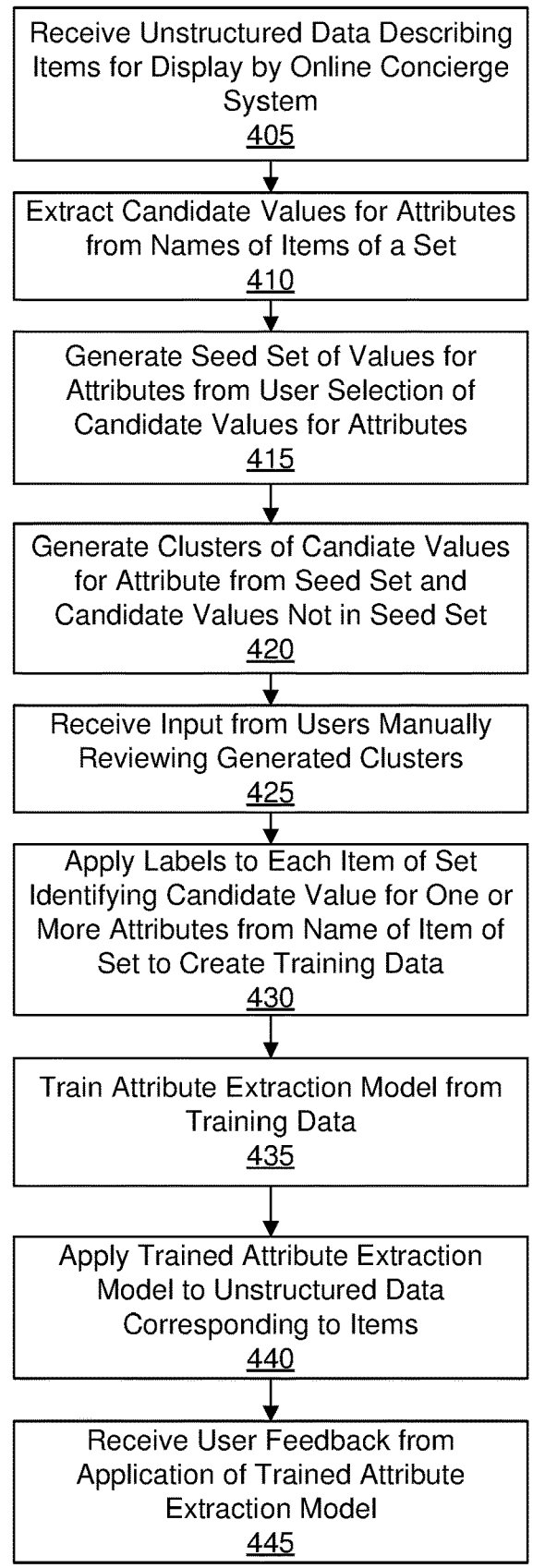
FIG. 4 is a flowchart of a method for an online concierge system generating structured data describing items from unstructured data describing the items, according to one embodiment.

Training a Model to Predict Values of Attributes for Items from Unstructured Data for Items FIG. 4 is a flowchart of one embodiment of a method for an online concierge system 102 generating structured data describing items from unstructured data describing the items. In various embodiments, the method includes different or additional steps than those described in conjunction with FIG. 4. Further, in some embodiments, the steps of the method may be performed in different orders than the order described in conjunction with FIG. 4. The method described in conjunction with FIG. 4 may be carried out by the online concierge system 102 in various embodiments.

An online concierge system 102, or another online system, receives 405 unstructured data describing various items for display to users of the online concierge system 102. In various embodiments, the online concierge system 102 receives an item catalog from a warehouse 110 that identifies various items offered for purchase via the warehouse 110. For example, an item catalog includes an item identifier for an item associated with a name of the item, with a textual description of the item, with one or more images of the item, with a category of the item, as well as any other suitable information describing the item. The name of an item comprises a text string including one or more words. In various embodiments, the item catalog includes any suitable information describing items offered for purchase by the warehouse 110.

For each of a set of items, the online concierge system 102 extracts 410 candidate values for attributes of an item from names of each item in the set. In various embodiments, the set of items is selected as items having a common category in a received item catalog or items associated with a common category by the online concierge system 102. To extract 410 candidate values for attributes of an item, the online concierge system 102 applies one or more natural language processing methods to a name of the item to generate segments from the name of the item. Each segment generated from a name of an item is a candidate value for an attribute of an item. The online concierge system 102 stores each candidate value as a segment from a name of an item of the set in association with a frequency with which a segment occurred in the set of items and a name of an item from which the segment was extracted 410. In various embodiments, the online concierge system 102 reviews and removes certain candidate values that were extracted 410. For example, the online concierge system 102 filters candidate values satisfying one or more criteria from the candidate values to reduce potential noise in the candidate values.

Additionally, the online concierge system 102 maintains a group of attributes for items of the set, with the group identifying attributes for items of the set. Hence, the group includes identifiers, such as names, of different attributes for items of the set. From the candidate values extracted 410 from names of items of the set, the online concierge system 102 generates 415 a seed set of values for various attributes of the group. The seed set associates an attribute with one or more potential attributes of the value from the candidate values extracted 410 from names of items of the set. In various embodiments, the online concierge system 102 generates 415 the seed set of values from inputs received from one or more users that associates one or more candidate values extracted 410 from names of items selected based on frequency of occurrence in the set of items with an attribute of the seed set. For example, the online concierge system 102 identifies candidate values associated with a threshold frequency of occurrence in the set of items to users along with identifiers of one or more attributes of the seed set, and receives inputs from the user associating an identified candidate value with an attribute, with an input indicating that a user determined the identified candidate value corresponds to the attribute. In another example, the online concierge system 102 ranks candidate values based on their associated frequencies of occurrence in the set of items and identifies candidate values having at least a threshold position in the ranking to users along with identifiers of one or more attributes of the seed set; as described above, the online concierge system 102 receives inputs from the user associating an identified candidate value with an attribute, with an input indicating that a user determined the identified candidate value corresponds to the attribute. In other embodiments, the online concierge system 102 uses any suitable criteria to identify a subset of the candidate values extracted 410 from names of items of the set along with identifiers of attributes to one or more users to receive inputs from the one or more users associating different candidate values with different attributes. By identifying a subset of the candidate values extracted 410 from names of items to users for association with attributes, the online concierge system 102 reduces a number of candidate values that users review, reducing an amount of time for users to associate candidate values with various attributes.

However, by identifying a subset of candidate values extracted 410 from names of items to users for association with attributes, candidate values not included in the subset are not associated with attributes. For example, candidate values 410 associated with less than a threshold frequency of occurrence or having less than a threshold position in a ranking based on frequency of occurrence are not associated with attributes, as they are not identified to one or more users for association with attributes. To associate other candidate values 410 with attributes, the online concierge system 102 generates 420 clusters of candidate values for attributes using the seed set of values and the candidate values 410 that were not selected based on frequency of occurrence in the set of items (e.g., candidate values having less than a threshold frequency of occurrence, candidate values having less than a threshold position in a ranking based on frequency of occurrence). In various embodiments, the online concierge system 102 generates 420 a cluster based on distances between candidate values. For example, the seed set of values comprises seed clusters to which candidate values not included in the seed set of values are added based on distances between candidate values not included in the seed set and seed clusters. A seed cluster comprises candidate values associated with a common attribute, so candidate values associated with different attributes comprise different seed clusters. Hence, a seed cluster corresponds to an attribute, with candidate values included in the seed cluster comprising potential values for the attribute. The online concierge system 102 generates 420 a cluster by determining distances between candidate values not selected based on their frequencies of occurrence in the set of items and seed clusters. The online concierge system 102 includes a candidate value not selected based on its frequency of occurrence in the set of items in a seed cluster having less than a threshold distance from the candidate value not selected based on its frequency of occurrence in the set of items or in a seed cluster having a minimum distance from the candidate value not selected based on its frequency of occurrence in the set of items. Inclusion of a candidate value not selected based on its frequency of occurrence in the set of items in a seed cluster indicates that the candidate value not selected based on its frequency of occurrence in the set of items is a value for an attribute corresponding to the seed cluster. The online concierge system 102 determines a distance between a seed cluster and a candidate value not selected based on its frequency of occurrence in the set of items as a semantic distance between the candidate value not selected based on its frequency of occurrence in the set of items and candidate values included in the seed cluster, with an average semantic distance between the candidate value not selected based on its frequency of occurrence in the set of items and candidate values included in the seed cluster providing the distance between the seed cluster and the candidate value not selected based on its frequency of occurrence in the set of items. Alternatively, the distance between a seed cluster and the candidate value not selected based on its frequency of occurrence in the set of items is a syntactic distance between candidate values in the seed cluster and the candidate value not selected based on its frequency of occurrence in the set of items. For example, the online concierge system 102 determines an average syntactic distance between the candidate value not selected based on its frequency of occurrence in the set of items and candidate values included in the seed cluster as the distance between the candidate value not selected based on its frequency of occurrence in the set of items and the seed cluster. In various embodiments, the online concierge system 102 generates a distance between a candidate value not selected based on its frequency of occurrence in the set of items and a seed group based on both semantic distances between the candidate value not selected based on its frequency of occurrence in the set of items and candidate values in the seed group and syntactic distances between the candidate value not selected based on its frequency of occurrence in the set of items and candidate values in the seed group.

By automatically generating 420 clusters that include candidate values not selected based on their frequency of occurrence in the set of items, the online concierge system 102 associates candidate values of the set with different attributes without receiving additional inputs from users after generating 415 the set of seed values. Reducing a number of candidate values presented to users for association with different attributes reduces an amount of time to correlate with different attributes. To improve accuracy of the generated clusters, the online concierge system 102 receives 425 inputs from one or more users manually reviewing the generated clusters. In various embodiments, the online concierge system 102 displays each of the generated clusters for an attribute with a prompt for a user to indicate an accuracy of clusters generated 420 for various attributes. The input from the user in response to the prompt identifies a cluster corresponding to an attribute and an indication whether candidate values included in the cluster are accurate. An input from a user may identify one or more candidate values to remove from a cluster generated 420 for an attribute. Prompting users to verify accuracy of clusters that the online concierge system 102 generated 420 reduces an amount of time for users to determine accuracy of candidate values for clusters compared to users associating each candidate value with an attribute.

In some embodiments, the online concierge system 102 iteratively generates 415 additional seed sets of values using the candidate values that were not included in the seed set. For example, the online concierge system 102 generates an additional seed set using candidate values associated with an additional threshold frequency of occurrence in the set of items that is lower than the threshold frequency of occurrence to users along with identifiers of one or more attributes of the seed set, and receives inputs from the user associating an identified candidate value with an attribute, with an input indicating that a user determined the identified candidate value corresponds to the attribute. In another example, the online concierge system 102 ranks candidate values that were not included in the seed set based on their associated frequencies of occurrence in the set of items and identifies candidate values having at least a threshold position in the ranking to users along with identifiers of one or more attributes of the seed set; as described above, the online concierge system 102 receives inputs from the user associating an identified candidate value with an attribute, with an input indicating that a user determined the identified candidate value corresponds to the attribute.

The online concierge system 102 generates clusters 420 clusters of attribute values using the additional seed set of values and the candidate values that are not included in the additional seed set, as further described above. Similarly, the online concierge system 102 receives 425 inputs from one or more users manually reviewing the generated clusters from the additional seed set, as further described above. The online concierge system 102 may iteratively generate 415 additional seed clusters, generate 420 clusters of candidate values for attributes from the additional seed sets, and receive 425 inputs from users manually reviewing the generated clusters until one or more stopping criteria are satisfied in various embodiments, allowing the online concierge system 102 to iteratively increase a number of candidate values for attributes that the users selected for inclusion in various seed sets. An example stopping criteria is receiving a selection of at least a threshold percentage of candidate values from users for inclusion in a seed group from users.

After generating 420 clusters of candidate values and receiving 425 inputs from one or more user who reviewed the clusters, the online concierge system 102 applies 430 labels to each item of the set by comparing segments from the name of the items to the candidate values associated with various attributes. In various embodiments, the online concierge system 102 compares non-overlapping segments extracted from the name of an item, as further described above, to candidate values for different attributes and applies 430 one or more labels identifying an attribute and a candidate value of the attribute matching a segment extracted from the name of the item to an identifier of the item. In some embodiments, the online concierge system 102 compares each segment of a name of an item of the set, extracted from the name of the item of the set as described above, to the candidate values for the attributes to determine values for the item of the set to identify in a label applied 430 to an identifier of the item of the set. In some embodiments, if overlapping segments extracted from a name of an item match candidate values of an attribute, the online concierge system 102 applies a label identifying the candidate value of an attribute matching a segment of the overlapping segment having a longer length. When applying 430 the one or more labels to an item of the set, the online concierge system 102 determines candidate values of different attributes matching non-overlapping segments of the name of the item of the set and applies 430 labels identifying a candidate value of an attribute matching a segment of the name of the item of the set to an identifier of the item of the set.

Applying labels to the identifiers of the items of the set generates a set of training data with examples of the training data each comprising an item and the one or more labels applied 430 to the item. From the set of training data, the online concierge system 102 trains 435 an attribute extraction model by applying the attribute prediction model to each of a plurality of examples of the training data. For an example of the training data (which includes information describing an item of the set, such as a name of an item or other unstructured text data describing the item), application of the attribute extraction model to the example generates one or more predicted values for one or more attributes for the example. The online concierge system determines an error term from a loss function based on a difference between the label applied to the example of the training data and the predicted values for one or more attributes for the example. The online concierge system repeatedly backpropagates the one or more error terms from the label applied to an example of the training data and the predicted values for one or more attributes through layers of a network comprising the attribute extraction model. The backpropagation of the one or more error terms is repeated by the online concierge system until the one or more loss functions satisfy one or more criteria. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the network comprising the attribute extraction model. For example, the online concierge system stores the weights of connections between nodes in the network as the set of parameters of the network in a non-transitory computer readable storage medium. Hence, training of the distance prediction model allows the online concierge system to generate and to store a neural network, or other machine learning model, that generates predicted values for attributes of an item from unstructured text data, such as a title, describing the item Alternatively, the online concierge system generates the trained attribute extraction model as a tree based ensemble model combining multiple decision trees. In various embodiments, the online concierge system selects at least a set of examples of the training data and trains a decision tree on each example of the set by applying a decision tree to each example and comparing predicted values for one or more attributes from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system sums the loss function over each example of the set to determine a total loss function and selects a feature having a minimum total loss function across the examples of the training data. Subsequently, the online concierge system splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The attribute extraction model comprises the set of trained decision trees, with individual decision trees predicting values for one or more attributes of an item predicted by at least a threshold number of the decision trees.

As another example, the online concierge system trains multiple decision trees in series, training an initial decision tree as described above and determining a loss function for the initial decision tree based on differences between predicted values for one or more attributes and one or more labels applied to the example of the training data. For example, the loss function is a squared error function between a predicted value of an attribute of an example of the training data and a label for the corresponding attribute applied to the example of the training data. The online concierge system trains another decision tree based on the results of the loss function for each example of the training data and iteratively trains decision trees, with results of the loss function from a decision tree used to train an immediately subsequent decision tree. The online concierge system iteratively trains decision trees from the results of the loss function from another decision tree until a specific number of decision trees are trained. The output of the attribute extraction model is a combination (e.g., a sum) of the predicted values for one or more attributes output by each of the trained decision trees.

The online concierge system 102 subsequently applies 440 the trained attribute extraction model to unstructured data corresponding to various items, such as names or titles of various items. Application of the trained attribute extraction model to unstructured data describing an item outputs predicted values for one or more attributes of the item, as further described above. As the predicted values for one or more attributes are used by the online concierge system 102 to select or to display items to users, the online concierge system 102 receives 445 feedback from users, with the received feedback providing indications of accuracy of the predicted values for one or more items. Based on the received feedback, the online concierge system 102 modifies one or more clusters of attribute values, so the feedback received 445 from users modifies candidate values for one or more attributes. The online concierge system 102 updates the training data in response to modifying candidate values for one or more attributes and re-trains the attribute extraction model using the updated training data in various embodiments, allowing feedback received while the trained attribute extraction model is in used to update the attribute extraction model.

Figure 5:
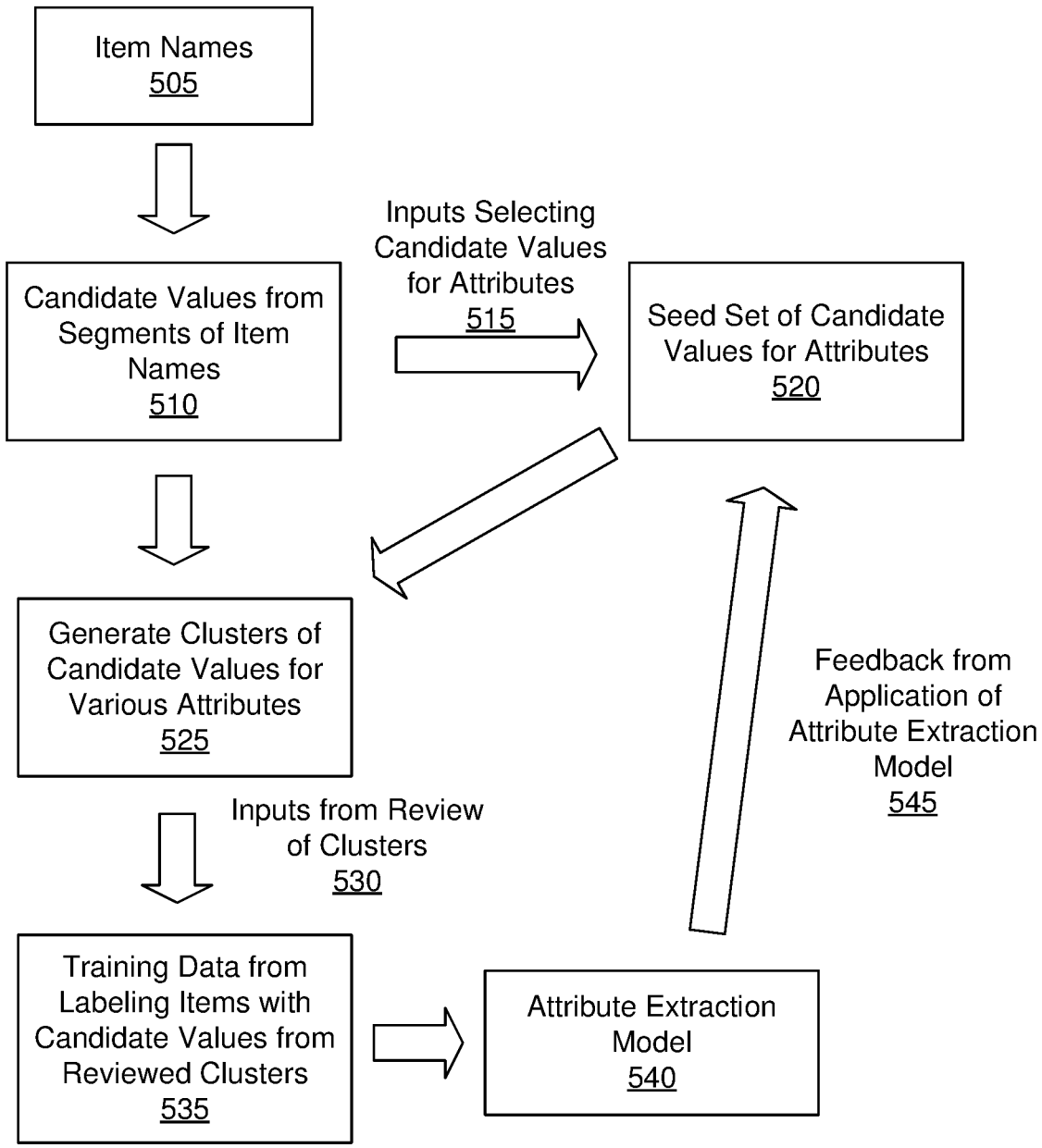
FIG. 5 is a process flow diagram of a method for an online concierge system generating structured data describing items from unstructured data describing the items, in accordance with an embodiment.

FIG. 5 is a process flow diagram of one a method for an online concierge system 102 generating structured data describing items from unstructured data describing the items. In the example of FIG. 5, the method uses item names 505 as the unstructured data, while in other embodiments, any suitable unstructured text data describing items (e.g., descriptions, titles, etc.) may be used as unstructured data describing items. The item names 505 correspond to items in a set, such as items having one or more common characteristics, in various embodiments. For example, the item names 505 are for items that are associated with a common category by the online concierge system 102 or by a warehouse 110

The online concierge system 505 segments each item name 505 using one or more natural language processing methods, with each segment comprising a candidate value 510 of an attribute for the items. For example, for an item name of "2% reduced fat milk," application of one or more natural language processing methods generates candidate values 510 of "2% reduced fat," "milk," "2%," "reduced fat," and may generate other candidate values 510 depending on the natural language processing methods applied to the item name 505.

Application of the one or more natural language processing methods allows the online concierge system 102 to leverage item names 505, or other unstructured text describing items, for candidate values 510 of attributes of items. Additionally, the online concierge system 102 associates a frequency with which a segment corresponding to a candidate value 510 occurred in item names 505 and associates an item name 505 from which the candidate values 510 was extracted with the candidate value 510.

Additionally, the online concierge system 102 maintains a group of attributes that includes identifiers, such as names, of different attributes for items. The online concierge system 102 displays identifiers of various attributes to users along with certain candidate values 510 extracted from item names 505 to users. Subsequently, the online concierge system 102 receives inputs 515 from users that associate candidate values 510 with identifiers of attributes. Hence, the received inputs 510 identify candidate values 510 for various attributes based on the inputs 515 received from the users. From the received inputs 510 associating candidate values with attributes, the online concierge system 102 generates a seed set 520 of values for various attributes. The seed set 520 associates an attribute with one or more potential values of the attribute from the candidate values 510 extracted from item names 505. In various embodiments, the online concierge system 102 generates the seed set 520 by identifying one or more candidate values 510 extracted from item names 505 that are selected based on frequencies of occurrence of the candidate values 510. For example, the online concierge system 102 identifies candidate values 510 associated with a threshold frequency of occurrence or having at least a threshold position in a ranking based on frequency of occurrence. Inputs 515 received from users associate identified candidate values 520 with different attributes to indicate potential values for different attributes.

The online concierge system 102 leverages the generated seed set 520 to generate clusters 525 of candidate values for various attributes from the candidate values 510. By identifying a subset of the candidate values 510 from their frequencies of occurrence allows the online concierge system 102 to reduce reduces a number of candidate values that users review, reducing an amount of time for users to associate candidate values with various attributes. To associate candidate values 510 not included in the subset identified to users (e.g., candidate values 510 associated with less than a threshold frequency of occurrence or having less than a threshold position in a ranking based on frequency of occurrence), the online concierge system 102 generates clusters 525 of candidate values for attributes using the seed set 520 of values. Candidate values 510 associated with attributes by the inputs 515 received from user form clusters of candidate values 510 corresponding to different attributes. The online concierge system 102 determines distances between candidate values 510 that were not identified to users and the clusters corresponding to different attributes and includes a candidate value 510 in a cluster based on distances between the candidate value 510 and different clusters. As further described above, the online concierge system 102 includes a candidate value 510 in a cluster from which the candidate value 510 has a minimum distance or has less than a threshold distance. The distance between a cluster and a candidate value 510 may be a semantic distance, a syntactic distance, or a combination of semantic distance and syntactic distance in various embodiments.

To improve accuracy of the generated clusters 525, the online concierge system 102 receives one or more inputs 530 from users, with an input 530 providing an indication of accuracy of one or more clusters 530. In some embodiments, the online concierge system 102 displays a generated cluster 525 and a prompt for a user to indicate whether the cluster 525 is accurate. An input 530 from the user indicates whether the cluster 525 is or is not accurate. In some embodiments, an input 530 identifies one or more candidate values 510 included in an incorrect cluster or identifies one or more candidate values 510 to remove from a cluster. This allows an input 530 from a user to modify candidate values 510 associated with an attribute by modifying candidate values 510 included in an attribute corresponding to the cluster 525. As further described in conjunction with FIG. 4, the online concierge system 102 may iteratively receive inputs 515 from users selecting candidate values for attributes, generate the seed set 520 of candidate values for various attributes, generate clusters 525 of candidate values for various attributes, and receive inputs 530 from users indicating accuracy of one or more clusters 535.

From the generated clusters 525 resulting from the received inputs 530 from users, the online concierge system 102 generates training data 535 including identifiers of items to which one or more labels indicating candidate values of one or more attributes determined from an item name 505 are applied. As further described above in conjunction with FIG. 5, the online concierge system 102 compares segments extracted from an item name 505 with candidate values 510 for attributes from the generated clusters 525 and applies a label to an identifier of the item identifying one or more candidate values 510 matching one or more segments extracted from the item name 505. From the training data 535, the online concierge system 102 generates an attribute extraction model 540 configured to receive an item name 505, or other unstructured data describing the item, and output predicted values of one or more attributes of a corresponding item from the item name 505, or other unstructured data describing the item. Generation of the attribute extraction model 540 from the training data 535 is further described above in conjunction with FIG. 4.

The online concierge system 102 applies the trained attribute extraction model 540 to items, such as item names 505, to predict values for one or more attributes of various items. The predicted values are associated with an identifier of an item and subsequently used by the online concierge system 102 to select items for a user or to display items to a user. During use of the trained attribute extraction model 540, the online concierge system 102 receives feedback 545 from users and updates or retrains the attribute extraction model 540 based on the feedback 545. Examples feedback 545 indicates whether an item selected or displayed based on the predicted values of one or more attributes is accurate or is relevant to a request from a user, allowing the online concierge system 102 to further refine the attribute extraction model 540 during its use.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   obtaining unstructured data describing items for display by an online concierge system, the unstructured data including a name of each item;
   identifying a set of items each having a common characteristic;
   extracting candidate values for attributes as segments from names of each item of the set, each candidate value associated with a frequency with which the segment occurs in the set of items;
   identifying a subset of candidate values based on frequency of occurrence in the set of items;
   generating a seed set of candidate values for one or more attributes from inputs received from one or more users associating candidate values of the subset with one or more attributes;
   generating clusters of candidate values from distances between candidate values not included in the subset and candidate values of the subset associated with one or more attributes, each cluster of candidate value corresponding to an attribute and including candidate values that are potential values for the attribute;
   receiving input from one or more users manually reviewing the generated clusters for accuracy;
   applying one or more labels to each item of the set, a label applied to an item of the set indicating a candidate value corresponding to an attribute matching a segment extracted from a name of the item of the set;
   generating training data including a plurality of examples, each example including an identifier of the item of the set and the one or more labels applied to the item of the set; and
   training an attribute extraction model to predict values for one or more attributes of an item from unstructured data describing the item by applying the attribute extraction model to the plurality of examples of the training data.

2. The method of claim 1, wherein identifying the subset of candidate values based on frequency of occurrence in the set of items comprises:
   selecting candidate values having at least a threshold frequency of occurrence in the set of items.

3. The method of claim 1, wherein identifying the subset of candidate values based on frequency of occurrence in the set of items comprises:
   ranking candidate values based on frequency of occurrence in the set of items; and
   selecting candidate values having at least a threshold position in the ranking.

4. The method of claim 1, wherein generating clusters of candidate values from distances between candidate values not included in the subset and candidate values of the subset associated with one or more attributes comprises:
   identifying seed clusters as candidate values of the subset associated each associated with a common attribute;
   identifying a candidate value not included in the subset;
   determining a distance between the candidate value not included in the subset and each seed cluster; and
   generating a cluster including the candidate value not included in the subset and a seed cluster having less than a threshold distance to the candidate value not included in the subset.

5. The method of claim 4, wherein the distance between the candidate value not included in the subset a seed cluster is based on semantic distances between the not included in the subset and candidate values included in the seed cluster.

6. The method of claim 4, wherein the distance between the candidate value not included in the subset a seed cluster is based on syntactic distances between the not included in the subset and candidate values included in the seed cluster.

7. The method of claim 1, wherein generating clusters of candidate values from distances between candidate values not included in the subset and candidate values of the subset associated with one or more attributes comprises:

identifying seed clusters as candidate values of the subset associated each associated with a common attribute;
identifying a candidate value not included in the subset;
determining a distance between the candidate value not included in the subset and each seed cluster; and
generating a cluster including the candidate value not included in the subset and a seed cluster having a minimum distance to the candidate value not included in the subset.

8. The method of claim 7, wherein the distance between the candidate value not included in the subset a seed cluster is based on semantic distances between the not included in the subset and candidate values included in the seed cluster.

9. The method of claim 7, wherein the distance between the candidate value not included in the subset a seed cluster is based on syntactic distances between the not included in the subset and candidate values included in the seed cluster.

10. The method of claim 1, further comprising:
applying the trained attribute extraction model to unstructured data describing additional items;
displaying one or more of the additional items to one or more users using predicted values for one or more of the additional items;
receiving feedback from a user to whom the one or more additional items were displayed; and
updating the training data based on the received feedback.

11. The method of claim 1, wherein receiving input from one or more users manually reviewing the generated clusters for accuracy comprises:
receiving an input from a user identifying a generated cluster corresponding to an attribute and an indication whether candidate values included in the generated cluster are accurate.

12. The method of claim 11, wherein the input identifies one or more candidate values to remove from the generated cluster.

13. A non-transitory computer readable medium having instructions encoded thereon that, when executed by a processor, cause the processor to:
obtain unstructured data describing items for display by an online concierge system, the unstructured data including a name of each item;
identify a set of items each having a common characteristic;
extract candidate values for attributes as segments from names of each item of the set, each candidate value associated with a frequency with which the segment occurs in the set of items;
identify a subset of candidate values based on frequency of occurrence in the set of items;
generate a seed set of candidate values for one or more attributes from inputs received from one or more users associating candidate values of the subset with one or more attributes;
generate clusters of candidate values from distances between candidate values not included in the subset and candidate values of the subset associated with one or more attributes, each cluster of candidate value corresponding to an attribute and including candidate values that are potential values for the attribute;
receive input from one or more users manually reviewing the generated clusters for accuracy;
apply one or more labels to each item of the set, a label applied to an item of the set indicating a candidate value corresponding to an attribute matching a segment extracted from a name of the item of the set;
generate training data including a plurality of examples, each example including an identifier of the item of the set and the one or more labels applied to the item of the set; and
train an attribute extraction model to predict values for one or more attributes of an item from unstructured data describing the item by applying the attribute extraction model to the plurality of examples of the training data.

14. The non-transitory computer readable medium of claim 13, wherein identify the subset of candidate values based on frequency of occurrence in the set of items comprises:
select candidate values having at least a threshold frequency of occurrence in the set of items.

15. The non-transitory computer readable medium of claim 13, wherein identify the subset of candidate values based on frequency of occurrence in the set of items comprises:
rank candidate values based on frequency of occurrence in the set of items; and
select candidate values having at least a threshold position in the ranking.

16. The non-transitory computer readable medium of claim 13, wherein generate clusters of candidate values from distances between candidate values not included in the subset and candidate values of the subset associated with one or more attributes comprises:
identify seed clusters as candidate values of the subset associated each associated with a common attribute;
identify a candidate value not included in the subset;
determine a distance between the candidate value not included in the subset and each seed cluster; and
generate a cluster including the candidate value not included in the subset and a seed cluster having less than a threshold distance to the candidate value not included in the subset.

17. The non-transitory computer readable medium of claim 16, wherein the distance between the candidate value not included in the subset a seed cluster is based on semantic distances between the not included in the subset and candidate values included in the seed cluster.

18. The non-transitory computer readable medium of claim 16, wherein the distance between the candidate value not included in the subset a seed cluster is based on syntactic distances between the not included in the subset and candidate values included in the seed cluster.

19. The non-transitory computer readable medium of claim 13, wherein generate clusters of candidate values from distances between candidate values not included in the subset and candidate values of the subset associated with one or more attributes comprises:
identify seed clusters as candidate values of the subset associated each associated with a common attribute;
identify a candidate value not included in the subset;
determine a distance between the candidate value not included in the subset and each seed cluster; and
generate a cluster including the candidate value not included in the subset and a seed cluster having a minimum distance to the candidate value not included in the subset.

20. The non-transitory computer readable medium of claim 19, wherein the distance between the candidate value not included in the subset a seed cluster is based on semantic distances between the not included in the subset and candidate values included in the seed cluster.

21. The non-transitory computer readable medium of claim 19, wherein the distance between the candidate value not included in the subset a seed cluster is based on syntactic distances between the not included in the subset and candidate values included in the seed cluster.

22. The non-transitory computer readable medium of claim 13, wherein the non-transitory computer readable storage medium further has instructions encoded thereon that, when executed by the processor, causes the processor to:
- apply the trained attribute extraction model to unstructured data describing additional items;
- display one or more of the additional items to one or more users using predicted values for one or more of the additional items;
- receive feedback from a user to whom the one or more additional items were displayed; and
- update the training data based on the received feedback.

23. The non-transitory computer readable medium of claim 13, wherein receive input from one or more users manually reviewing the generated clusters for accuracy comprises:
- receive an input from a user identifying a generated cluster corresponding to an attribute and an indication whether candidate values included in the generated cluster are accurate.

24. The non-transitory computer readable medium of claim 23, wherein the input identifies one or more candidate values to remove from the generated cluster.

* * * * *